US 6,765,925 B1

(12) United States Patent
Sawyer et al.

(10) Patent No.: US 6,765,925 B1
(45) Date of Patent: Jul. 20, 2004

(54) APPARATUS AND METHOD OF MAINTAINING STATE IN A DATA TRANSMISSION SYSTEM

(75) Inventors: Wilson Sawyer, E. Hampstead, NH (US); John M. Ulm, Pepperell, MA (US)

(73) Assignee: Nortel Networks Limited, Montreal (CA)

(*) Notice: Subject to any disclaimer, the term of this patent is extended or adjusted under 35 U.S.C. 154(b) by 788 days.

(21) Appl. No.: 09/672,801

(22) Filed: Sep. 28, 2000

(51) Int. Cl.[7] .............................. H04J 3/16; H04J 3/22
(52) U.S. Cl. ......................... 370/465; 370/486; 375/222
(58) Field of Search .......................... 370/254, 351–356, 370/365, 310, 464, 485, 486, 487, 503; 375/222; 725/111, 105, 86

(56) References Cited

U.S. PATENT DOCUMENTS

| 6,031,841 | A  | * | 2/2000  | Woundy ..................... 370/410 |
| 6,282,660 | B1 | * | 8/2001  | Anne et al. ................. 713/300 |
| 6,324,184 | B1 | * | 11/2001 | Hou et al. ................... 370/468 |
| 6,523,126 | B1 | * | 2/2003  | Brabenac .................... 713/323 |
| 6,574,797 | B1 | * | 6/2003  | Naegeli et al. ............. 725/120 |
| 6,594,305 | B1 | * | 7/2003  | Roeck et al. ............... 375/222 |
| 6,643,780 | B1 | * | 11/2003 | Cooper ....................... 713/201 |
| 6,654,957 | B1 | * | 11/2003 | Moore et al. ............... 725/111 |

OTHER PUBLICATIONS

Data Over Cable Interface Specifications, Cable Modem Termination System—Network Side Interface Specification, SP–CMTS–NS1101–960702, 1996.
Chapman, "Dynamic Channel Change Proposal for DOCSIS 1.1", Cisco Systems, Mar. 28, 2000.
Data–Over–Cable Service Interface Specifications, Radio Frequency Interface Specification, SP–RFIv1.1–104000407, 1999, 2000 Cable Television Laboratories, Inc.

* cited by examiner

Primary Examiner—Ajit Patel
(74) Attorney, Agent, or Firm—Bromberg & Sunstein LLP

(57) ABSTRACT

An apparatus and method of maintaining state information for a network device changing from a first channel (in communication with a first base unit) to a second channel (in communication with a second base unit) communicates with at least one of the first base unit and an intermediate network device to ascertain the state information. Once the state information is ascertained, it is applied to the communication of the network device with the second base unit. Both the first and second base units are independently operable network devices in a data transmission network.

48 Claims, 7 Drawing Sheets

APPARATUS AND METHOD OF MAINTAINING STATE IN A DATA TRANSMISSION SYSTEM

FIELD OF THE INVENTION

The invention relates generally to data transmission networks and, more particularly, the invention relates to maintaining and/or transferring user/configuration state data when changing a network device between data transmission systems.

BACKGROUND OF THE INVENTION

FIG. 1 schematically shows a well known network arrangement for connecting various types of computer systems (e.g., personal computers and Internet appliances) with the Internet. Such arrangement includes a computer system that communicates with the Internet via an Internet Service Provider ("ISP"). To provide the data connection to the ISP, the computer is coupled with a modem that modulates and demodulates its communications with the ISP.

There are a variety of different types of modem technologies currently available. One widely used and inexpensive type of modem, known as a "telephone modem," connects with the ISP via the public switched telephone network (i.e., via the telephone system). Currently available telephone modems commonly operate at maximum speeds of about 53–56 kilobits per second (Kbps).

Although relatively inexpensive and easy to use, telephone modems do not provide enough bandwidth for many users. Accordingly, other types of modems have been developed to provide bandwidths that are multiple times larger than those provided by telephone modems. One such type of modem, known as a "cable modem," typically provides speeds in the megabits per second (Mbps) range. As the name suggests, instead of using the telephone system, cable modems communicate with an ISP through the cable network commonly used for television transmission (i.e., transmission systems commonly referred to as providing "cable TV").

Cable modems communicate with a head end base unit (typically controlled by a cable operator that acts as an ISP) that provides the computer system with a connection to the Internet. Among other functions, the head end base unit (known as a cable modem termination system and referred to herein as a "CMTS") includes the logic for controlling the connection with the cable modem. For example, the CMTS includes memory for storing state information that defines the various parameters of the cable modem connection, and logic for applying the state information to the connection. Exemplary state information (discussed below) may include the type of service a computer system is to receive from the ISP (e.g., premium service for enhanced functionality, or basic service for a simple connection to the Internet), security data, maximum bandwidth permitted for use by the computer system, and policy data.

Among other things, state information may be considered to be information that relates to the state of a given cable connection. Specifically, when joining the cable network, there are a number of steps that a cable modem must execute to establish a steady state connection (see, for example, the well known DOCSIS standard, noted below). Namely, in addition to establishing physical communication (e.g., conventional executing synchronization and ranging operations), a cable modem must execute a registration process, and retrieve configuration information. These processes may include authentication, as well as the initialization of security associations. Various class of service information also may be provided to the cable modem and/or the CMTS based upon the service agreements that the user has with the ISP. All of this information is part of the state information associated with the cable modem. In addition, during operation, a cable modem can perform additional operations that may add, delete or change its state information. For example, a given cable modem may establish a flow with a specific Quality of Service to execute an particular application, such as voice-over-IP.

Cable network systems are broadband systems and thus, allow multiple channels to co-exist on a single system. Accordingly, one CMTS can communicate with multiple cable modems simultaneously. To that end, current CMTSs often include a plurality of channels that each can be used by one or more cable modems. When data traffic on one channel becomes too heavy, the CMTS can cause one or more cable modems using such channel to use a different channel. To that end, the CMTS transmits a channel change message to such modems. In response, the receiving cable modems begin using the different channel. All state information relating to such cable modems (i.e., state information relating to their coupled computer system) thus is maintained by the single CMTS. For additional information relating to cable modems and their interaction with a CMTS, see, "Data-Over-Cable Service Interface Specifications, Radio Frequency Interface Specification," which is a cooperative effort under the direction of Cable Television Laboratories, Inc., with a copyright of 1999 and 2000 and document control number SP-RFIv1.1-I04-000407, the disclosure of which is incorporated herein, in its entirety, by reference. This specification is commonly referred to in the art by the acronym "DOCSIS."

There are instances, however, where it would be desirable to move one or more cable modems to one or more different channels on a different CMTS. For example, all channels on a single CMTS may be full, while another CMTS may have some available channels. One problem with changing to a channel on another CMTS, however, is that such a change loses state information for the changed cable modem.

SUMMARY OF THE INVENTION

In accordance with one aspect of the invention, an apparatus and method of maintaining state information for a network device changing from a first channel (in communication with a first base unit) to a second channel (in communication with a second base unit) communicates with at least one of the first base unit and an intermediate network device to ascertain the state information. Once the state information is ascertained, it is applied to the communication of the network device with the second base unit. Both the first and second base units are independently operable network devices in a data transmission network.

In some embodiments, the state information is ascertained by receiving a message with the state information from the first network device. In other embodiments, the state information is ascertained by receiving a message with the state information from an intermediate device. In still other embodiments, the state information is ascertained by retrieving the state information from a memory device that is accessible by the second base unit.

The transmission network may be a wireless network, a cable system, or other type of broadband network. When a cable system (e.g., a DOCSIS system), the base units are cable modem termination systems. The state information may relate to use of the second channel by the network device. Among others things, the state information may relate to at least one of bandwidth, quality of service, throughput, security, service level agreements, and policy data. In illustrative embodiments, the second base unit communicates with the one of the first base unit and the intermediate network device, and applies the state information. In addition, the second base unit may determine that it is to communicate with the network device via the second channel. Moreover, the state data may be applied by transmitting a message having the state information to the network device.

In accordance with other aspects of the invention, a system for maintaining state information relating to a network device changing from a first channel to a second channel includes a first base unit, a second base unit, and a state module capable of obtaining the state information for the second base unit. The first base unit has a first interface to the first channel, while the second base unit has a second interface to the second channel. The first base unit also includes the state information, while the first and second base units are independently operable. Among other locations, the state module may exist as a separate entity, or may be embedded in either of the base units.

In accordance with yet another aspect of the invention, a method and apparatus for controlling the communication of a network device with a head end first determines that the network device is to be moved from a first channel (to which it is registered) to a second channel. The first channel is associated with a first base unit, while the second channel is associated with a second base unit. The first and second base units are both a part of the head end of a network system, and are independently operating network devices. The network device then is communicated with via the second channel. State information relating to the network device is obtained.

Preferred embodiments of the invention are implemented as a computer program product having a computer usable medium with computer readable program code thereon. The computer readable code may be read and utilized by the computer system in accordance with conventional processes.

BRIEF DESCRIPTION OF THE DRAWINGS

The foregoing and advantages of the invention will be appreciated more fully from the following further description thereof with reference to the accompanying drawings wherein.

DESCRIPTION OF ILLUSTRATIVE EMBODIMENTS

In illustrative embodiments of the invention, state information relating to a cable modem is maintained when such cable modem is transferred to a channel maintained by a different cable modem termination system. Details of devices and methods implementing such embodiments are discussed below.

Figure 1:
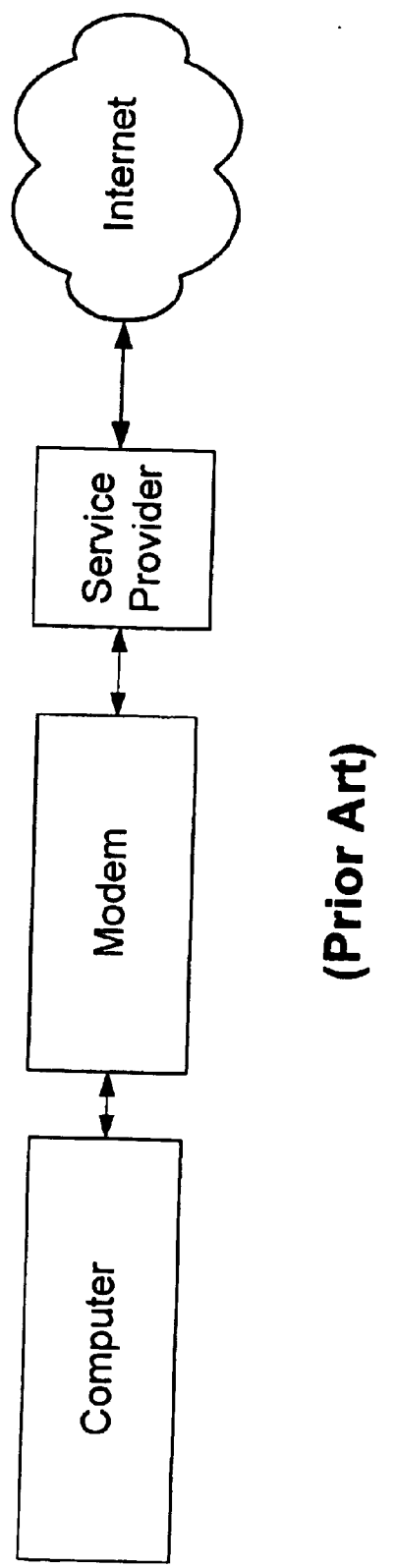
FIG. 1 schematically shows a well known network arrangement that may be used by a computer system for connecting with the Internet.
Figure 2:
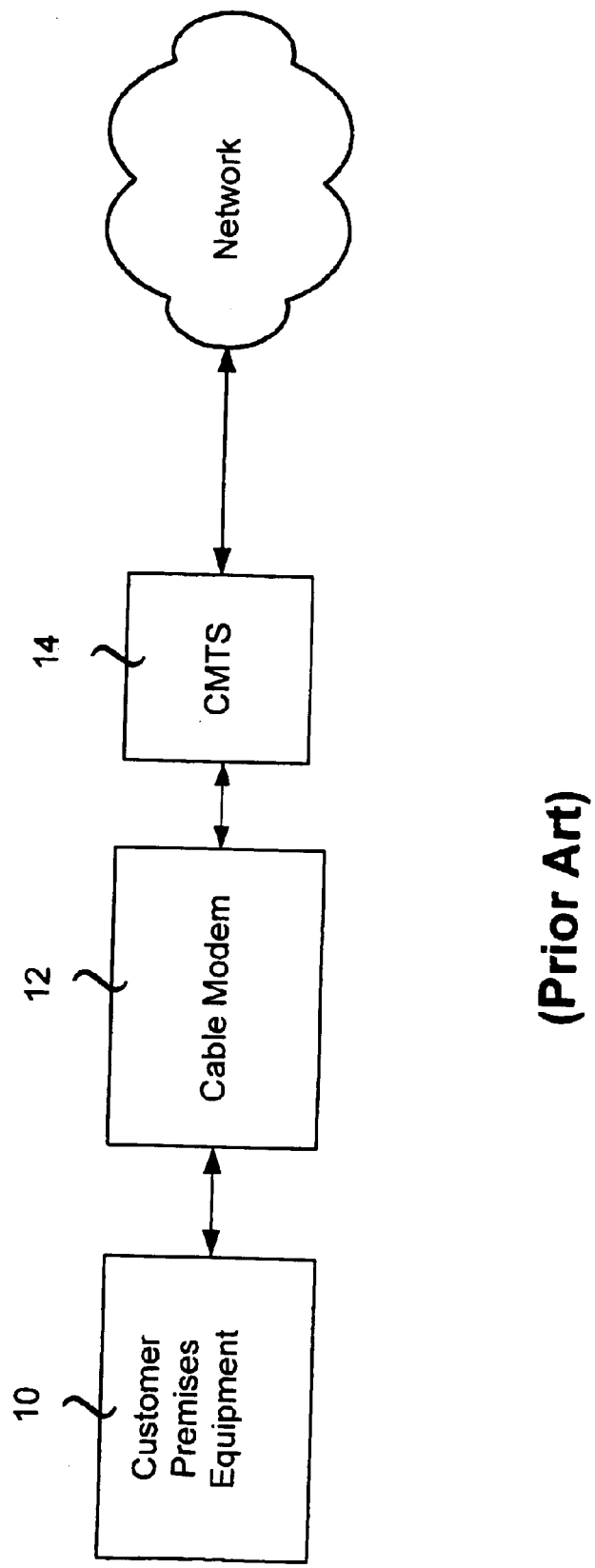
FIG. 2 schematically shows a network arrangement that employs a cable modem for connecting with the Internet.

FIG. 2 shows an exemplary cable network arrangement that may be used to implement illustrative embodiments of the invention. Specifically, the network arrangement includes customer premises equipment 10 having an attached cable modem 12. The customer premises equipment 10 may be any computer device, such as a personal computer or an Internet appliance. For simplicity, the customer premises equipment 10 is discussed herein generically as a computer system 10. The cable modem 12 communicates with a cable modem termination system ("CMTS 14"), which acts as an Internet Service Provider ("ISP") to the computer system 10. As known in the art, the CMTS 14 has an interface for coupling with a plurality of cable modems (including the cable modem 12 shown), and an interface for coupling with the Internet.

Figure 3A:
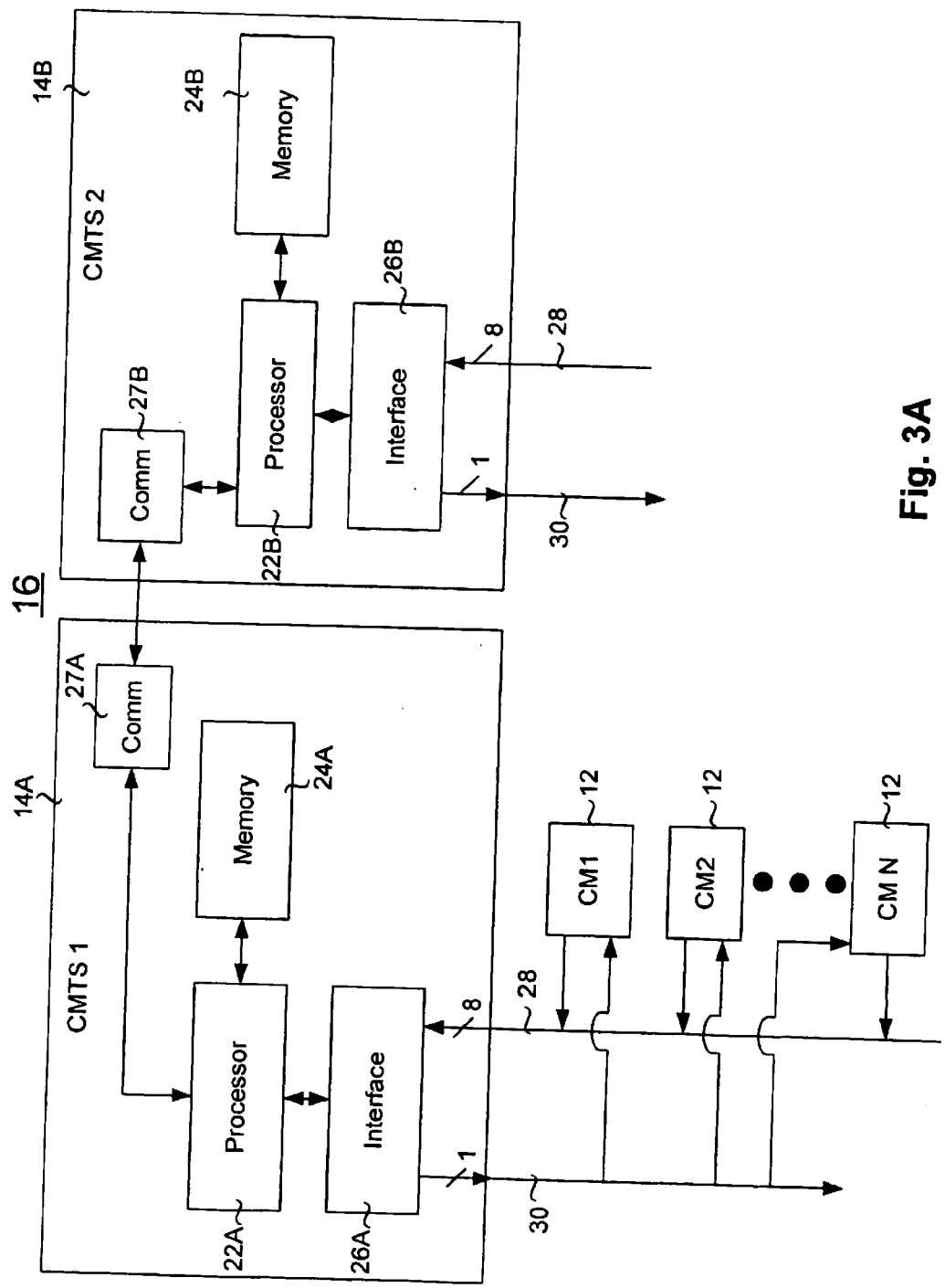
FIG. 3A schematically shows two cable modem termination systems configured in accordance with illustrative embodiments of the invention.

FIG. 3A schematically shows a head end 16 of a cable system. The head end 16 includes a first CMTS 14A and a second CMTS 14B that both implement illustrative embodiments of the invention. Each of the two CMTSs shown in FIG. 3A is an independently operating network device with separate functional modules. Although autonomous, both CMTSs preferably are members of a common cable network (i.e., the head end 16) and thus, can be in physical communication with the same cable modems 12. For additional details relating to a conventional CMTS and its functions, see the incorporated document entitled, "Data-Over-Cable Service Interface Specifications, Radio Frequency Interface Specification."

Figure 6:
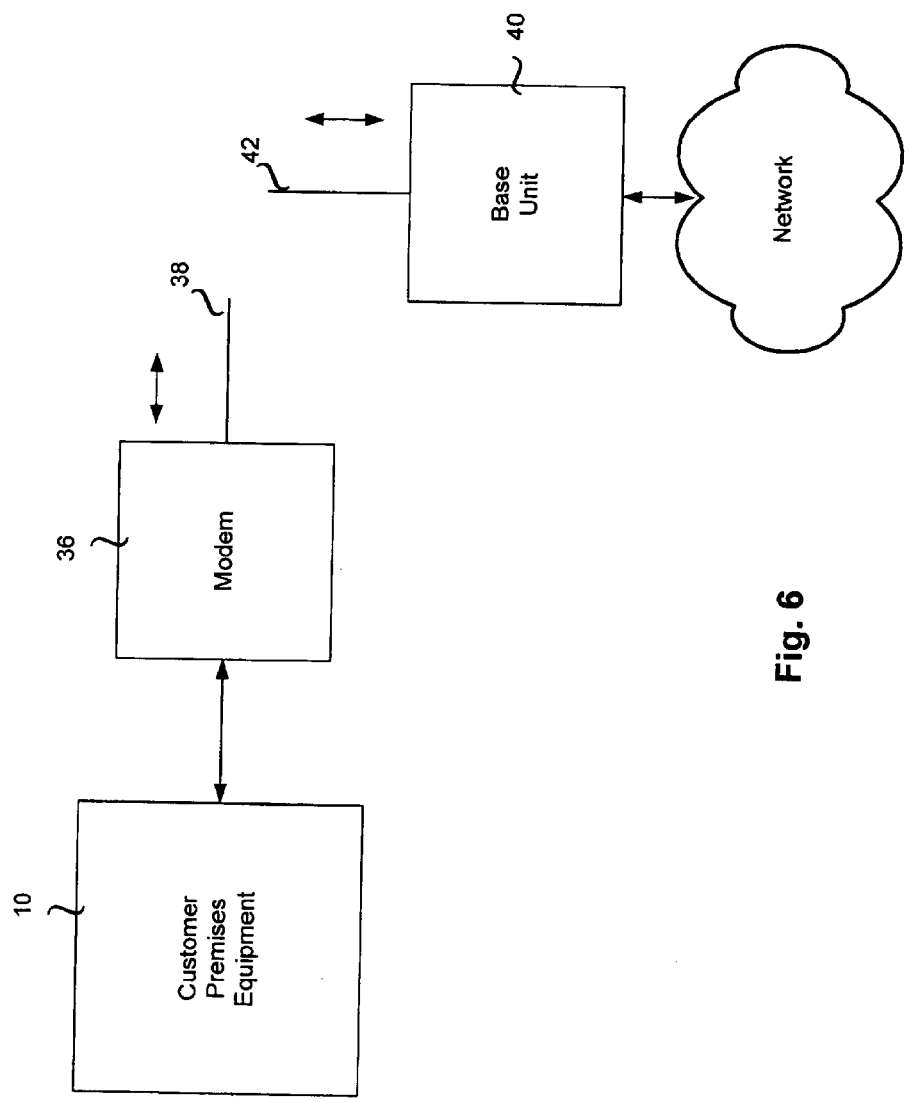
FIG. 6 schematically shows a wireless network arrangement that may be used to implement illustrative embodiments of the invention.

As discussed below with reference to FIG. 6, however, principles of illustrative embodiments may be applied to other technologies. Accordingly, principles of illustrative embodiments generally apply to base units at the head end 16 of a bi-directional data communication system. Each such base unit has common logic that maintains state information for cable modems 12 coupling with its one or more interfaces. A CMTS is thus one implementation of illustrative embodiments.

Among other things, the first CMTS 14A includes a processor 22A for performing the logical operations executed by the first CMTS 14A (i.e., the functions described in illustrative embodiments, as well as those in the noted interface specifications), memory 24A for storing data (e.g., volatile memory, such as random access memory and/or non-volatile long term memory, such as a flash memory device), and an interface module 26A for logically coupling with a plurality of cable modems 12. In addition, the first CMTS 14A includes a communication module 27A that determines state information from other network devices in accordance with illustrative embodiments of the invention. Details of the processes used by the communication module 27A are discussed below with reference to FIG. 5.

In the embodiment shown, the interface module 26A includes one downstream channel 28 for transmitting data to the plurality of cable modems 12, and eight upstream channels 30 for receiving data from each of the plurality of cable modems 12. The downstream channel 28 may have a bandwidth of about 27 to 50 Mbps, while each upstream channel 30 may have a bandwidth of about 256 Kbps to 30 Mbps. Each of the upstream and downstream channels 28 and 30 may be logically shared by multiple cable modems 12 in accordance with conventional media access control ("MAC") techniques as defined by the DOCSIS standard. Of course, it should be noted that the interface module 26A may support different numbers of channels than those shown in FIGS. 3A and 3B. Moreover, the first CMTS 14A (as well as the second CMTS 14B, discussed below) may have a plurality of interface modules 26 that each support a preset number of downstream and/or upstream channels 28 and 30.

The second CMTS 14B includes functional modules the correspond to those on the first CMTS 14A. Accordingly, the second CMTS 14B also includes a processor 22B for performing the logical operations executed by the second CMTS 14B, memory 24B for storing data, and an interface module 26B for logically coupling with a plurality of cable modems 12. In addition, the second CMTS 14B also includes a communication module 27B.

Each channel 28 and/or 30 maintained by the various interface modules 26 of the two CMTSs 14A and 14B has a unique operating frequency range. These operating frequency ranges preferably do not overlap with any other channels 28 and/or 30 of either CMTS on a given cable system. Accordingly, although the two CMTSs are autonomous network devices, both preferably have complimentary frequency ranges for their respective channels. Moreover, as suggested above, the plurality of cable modems 12 are discussed herein as being logically connected only and thus, a physical connection is assumed. Stated another way, both the first and second CMTS 14A and 14B exist on a single cable system and thus, each cable modem 12 has a physical communication to both CMTSs. In other embodiments, multiple CMTSs communicate with a single group of cable modems. An example of such other embodiments can include spread spectrum.

Figure 3B:
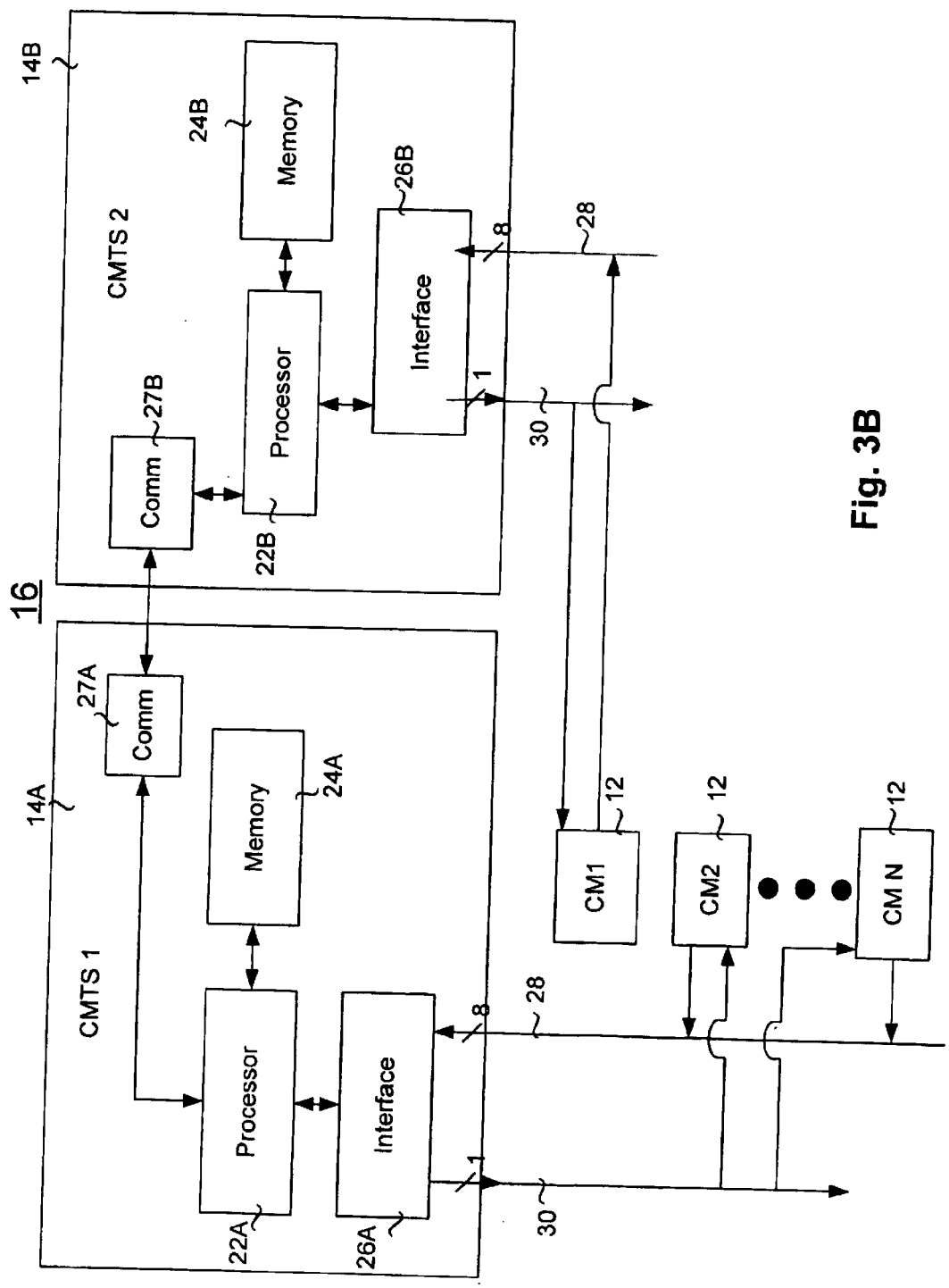
FIG. 3B schematically shows the two cable modem termination systems in FIG. 3A with different coupled cable modems.

As shown in FIG. 3A, the first CMTS 14A is logically connected to all of the cable modems 12, while the second CMTS 14B is not logically connected to any of the cable modems 12. For various reasons, any of the plurality of cable modems 12 may be moved from a channel 28 or 30 maintained by the first CMTS 14A, to a channel 28 or 30 maintained by the second CMTS 14B. For example, if the upstream channels 30 of the first CMTS 14A are extremely busy, illustrative embodiments may move one or more cable modems 12 to an upstream channel 30 maintained by the second CMTS 14B. This process often is referred to in the art as "load balancing." FIG. 3B shows one such case, where the cable modem 12 identified as "CM1" is moved from channels 28 and 30 maintained by the first CMTS 14A, to the upstream and downstream channels 30 and 28 of the second CMTS 14B. When this occurs, the communication module 27B on the second CMTS 14B communicates with some network device (discussed below) to ascertain the state information relating to CM1. Such network device may include the first CMTS 14A, an intermediate network device 34 (see FIG. 4), or some other network device that maintains the state information.

Figure 5:
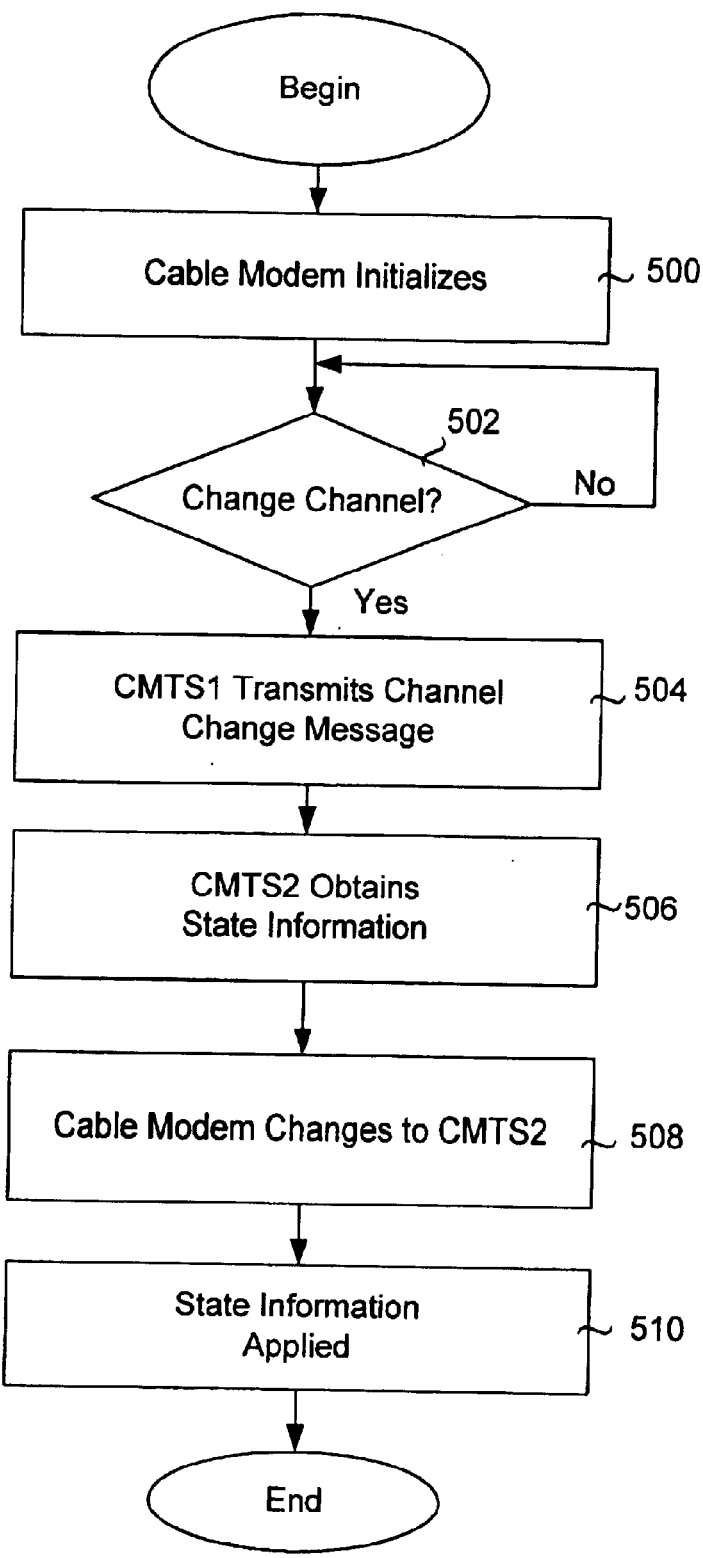
FIG. 5 shows a process used by a cable modem for changing from the first cable modem termination system to the second cable modem termination system in accordance with illustrative embodiments of the invention.

FIG. 5 shows a process of moving a given cable modem 12 from one or more channels 28 and/or 30 on the first CMTS 14A, to one or more channels 28 and/or 30 on the second CMTS 14B. As discussed, this process maintains the state information relating to the given cable modem 12. The process begins at step 500, in which the given cable modem 12 initializes itself with regard to the cable network in accordance with conventional processes. To that end, the given cable modem 12 first executes conventional ranging operations via one of the upstream channels 30 (e.g., the last channel used by the given cable modem 12) on the first CMTS 14A. Specifically, the given cable modem 12 transmits an upstream message requesting access to the first CMTS 14A. Based upon this initial interaction, the given cable modem 12 adapts to the physical parameters of the first CMTS 14A, and the cable network.

After ranging operations are completed, the given cable modem 12 executes conventional registration operations, in which the CMTS determines the appropriate channels 28 and/or 30 to assign to the given cable modem 12. Other data may be obtained, such as state data, during this process. In some embodiments, the registration data is retrieved by the first CMTS 14A from a remote file transfer protocol ("FTP") server (not shown), and then stored in its local memory 24A. For additional information relating to the initialization process, see the incorporated "Data-Over-Cable Service Interface Specifications, Radio Frequency Interface Specification."

Once the cable modem 12 is initialized, it can communicate with the CMTS, and ultimately the Internet, in a conventional manner until a channel change occurs. To that end, it is determined at step 502 if the given cable modem 12 is to be moved to a channel 28 and/or 30 on the second CMTS 14B. In illustrative embodiments, the given cable modem 12 receives a conventional dynamic change command from the first CMTS 14A instructing the cable modem 12 to communicate on a channel 28 and/or 30 with a different frequency than that currently used by such cable modem 12 (step 504). Such channel 28 and/or 30 (i.e., at the different frequency), in the example discussed, is maintained by the second CMTS 14B. In other embodiments, the given cable modem 12 may poll the CMTS to ascertain this information.

The process then continues to step 506, in which the second CMTS 14B obtains the state information relating to the given cable modem 12. In illustrative embodiments, the communication module 27A in the first CMTS 14A communicates with the communication module 27B in the second CMTS 14B to exchange the relevant data in a peer-to-peer manner. For example, prior to transmitting the dynamic change command to the given cable modem 12, the communication module 27A in the first CMTS 14A may transmit a message (with the state information) to the communication module 27B in the second CMTS 14B. In other embodiments, the communication module 27B in the second CMTS 14B may detect that the given cable modem 12 is using one of its channels and, consequently contact the first CMTS 14A to obtain the relevant state information.

Figure 4:
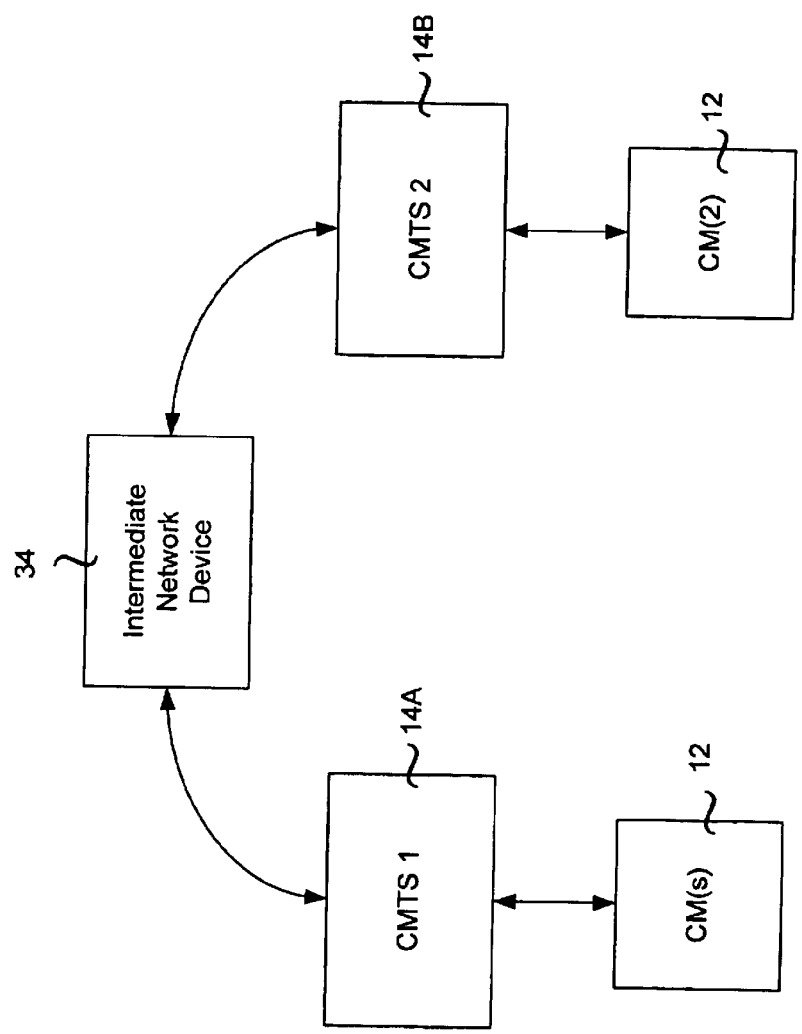
FIG. 4 schematically shows two cable modem termination systems that exchange state information via a broker device.

As noted above, the second CMTS 14B can obtain the state information from an intermediate network device 34 (FIG. 4). Such intermediate network device 34 can be any network device that can perform such functions, such as server that actively maintains a database of the state information of all cable modems 12 in use by both the first and second CMTSs 14A and 14B. Additionally, in some embodiments, the intermediate network device 34 may control load balancing and channel changing operations. Moreover, the intermediate network device 34 can also include a disk array that is accessible by the communication modules 27A and 27B of either of the first and second CMTSs 14A and 14B.

In still other embodiments, the intermediate network device 34 includes the logic for controlling the transfer of state information from the first CMTS 14A to the second CMTS 14B. For example, the intermediate device 34 may receive a message notifying it of the channel change from the first CMTS 14A to the second CMTS 14B. In response, the intermediate network device 34 may actively retrieve the state information from the first CMTS 14A. Once retrieved, the intermediate network device 34 may transmit such data to the second CMTS 14B. Upon receipt, the second CMTS 14B can apply such data to the moved cable modem 12, as necessary.

Accordingly, after it receives the dynamic change command, the given cable modem 12 can move to the new channel 28 and/or 30 maintained by the second CMTS 14B (step 508). The state information thus is applied to all communications by such cable modem 12 (step 510), thus relatively seamlessly continuing communication with the head end 16 by using the new channel(s) 28 and/or 30 of the second CMTS 14B.

It should be noted that the steps of this process can be executed in a different order. For example, steps 504 and 506 could be executed simultaneously, or step 506 could be executed before step 504. The order of the steps in the process shown in FIG. 5 thus is exemplary and not intended to limit the scope of various embodiments of the invention. It also should be noted that the functionality in each CMTS preferably is identical. Accordingly, each CMTS may operate as either the CMTS receiving the moved cable modem 12, or the CMTS moving the moved cable modem 12. Moreover, principles of illustrative embodiments also apply to cable systems having more than two CMTSs. Discussion of two CMTSs thus was to simplify the discussion of the various embodiments of the invention.

Principles of illustrative embodiments of the invention may be applied to other non-cable based networks. FIG. 6 schematically shows one such type of network, in which customer premises equipment 10 communicates with a larger network via a wireless medium. Such network includes the customer premises equipment 10, coupled with a modem 36 that has an attached transponder 38 (e.g., an antenna). The modem 36 thus communicates with a base unit 40 via its complimentarily attached transponder 42. The base unit 40 may operate in accord with the described processes.

There are instances when the first CMTS 14A may become unavailable while it is still communicating with an active cable modem 12. For example, the first CMTS 14A may unexpectedly malfunction (i.e., crash), or may be taken off line for scheduled maintenance while it is communicating with one of the cable modems 12. Accordingly, in illustrative embodiments, each cable modem 12 may be assigned an alternative CMTS to use when the CMTS it is using is no longer responding. To that end, during registration (i.e., step 500 of FIG. 5), the first CMTS 14A may transmit a tentative dynamic channel change message indicating that the given cable modem 12 is to go to a channel 28 and/or 30 maintained by the second CMTS 14B if the first CMTS 14A is not responding within a certain time interval. Such information includes the frequencies to be used for upstream transmissions and downstream transmissions on the second CMTS 14B. Accordingly, at step 508, the given cable modem 12 merely retrieves the new channel data (i.e., the tentative dynamic channel change message) from local memory in the given cable modem 12. In some embodiments, such new channel data may be stored remotely in memory accessible to the given cable modem 12.

Various aspects of the invention may be implemented in an conventional computer programming language. For example, preferred embodiments may be implemented in a procedural programming language (e.g., "C"), or an object oriented programming language (e.g., "C++"). Alternative embodiments of the invention may be implemented as preprogrammed hardware elements (e.g., application specific integrated circuits and/or digital signal processors), or other related components.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. As known in the art, such computer instructions can be written in a number of programming languages for use with many computer architectures and operating systems. Furthermore, such instructions may be stored in any memory device, such as semiconductor, magnetic, optical or other memory devices, and may be transmitted using any communications technology, such as optical, infrared, microwave, or other transmission technologies. Among other modes, the computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

We claim:

1. A method of maintaining state information for a network device changing from a first channel to a second channel in a data transmission system, the first channel being in communication with a first base unit, the second channel being in communication with a second base unit, the first and second base units being independently operable network devices, the method comprising:

communicating with at least one of the first base unit and an intermediate network device to ascertain the state information; and applying the state information to the communication of the network device with the second base unit.

2. The method as defined by claim 1 wherein the act of communicating comprises:

receiving a message from the first network device, the message having the state information.

3. The method as defined by claim 1 wherein the act of communicating comprises:

receiving a message from an intermediate network device, the message having the state information.

4. The method as defined by claim 1 wherein the act of communicating comprises:

retrieving the state information from a memory device that is accessible by the second base unit.

5. The method as defined by claim 1 wherein the first and second base units are cable modem termination systems.

6. The method as defined by claim 1 wherein the base unit communicates with the network device via wireless transmission techniques.

7. The method as defined by claim 1 wherein the state information relates to use of the second channel by the network device.

8. The method as defined by claim 1 wherein the state information relates to at least one of bandwidth, quality of service, throughput, security, and policy data.

9. The method as defined by claim 1 wherein the second base unit executes the act of communicating and the act of applying, the method further comprising:

the second base unit determining that it is to communicate with the network device via the second channel.

10. The method as defined by claim 1 wherein the act of applying comprises:

transmitting a message to the network device, the message including the state information.

11. An apparatus for maintaining state information for a network device changing from a first channel to a second channel in a data transmission system, the first channel being in communication with a first base unit, the second channel being in communication with a second base unit, the first and second base units being independently operable network devices, the apparatus comprising:

a communication module capable of communicating with at least one of the first base unit and an intermediate network device to ascertain the state information; and a state processor in communication with the communication module, the state processor being capable of applying the state information to the communication of the network device with the second base unit.

12. The apparatus as defined by claim 11 wherein the communication module comprises:

an interface capable of receiving a message from the first network device, the message having the state information.

13. The apparatus as defined by claim 11 wherein the communication module comprises:

an interface capable of receiving a message from an intermediate network device, the message having the state information.

14. The apparatus as defined by claim 11 wherein the communication module comprises:

a retrieving module capable of retrieving the state information from a memory device that is accessible by the second base unit.

15. The apparatus as defined by claim 11 wherein the first and second base units are cable modem termination systems.

16. The apparatus as defined by claim 11 wherein the base unit communicates with the network device via wireless transmission techniques.

17. The apparatus as defined by claim 11 wherein the state information relates to use of the second channel by the network device.

18. The apparatus as defined by claim 11 wherein the state information relates to at least one of bandwidth, quality of service, throughput, security, and policy data.

19. The apparatus as defined by claim 11 wherein the second base unit includes the communication module and the state processor, the apparatus further comprising:

a determining unit capable of determining if the second base unit is to communicate with the network device via the second channel.

20. The apparatus as defined by claim 11 wherein the state processor comprises:

an output module capable of transmitting a message to the network device, the message including the state information.

21. A computer program product for use on a computer system for maintaining state information for a network device changing from a first channel to a second channel in a data transmission system, the first channel being in communication with a first base unit, the second channel being in communication with a second base unit, the first and second base units being independently operable network devices, the computer program product comprising a computer usable medium having computer readable code thereon, the computer readable program code comprising:

program code for communicating with at least one of the first base unit and an intermediate network device to ascertain the state information; and program code for applying the state information to the communication of the network device with the second base unit.

22. The computer program product as defined by claim 21 wherein the program code for communicating comprises:

program code for receiving a message from the first network device, the message having the state information.

23. The computer program product as defined by claim 21 wherein the program code for communicating comprises:

program code for receiving a message from an intermediate network device, the message having the state information.

24. The computer program product as defined by claim 21 wherein the program code for communicating comprises:

program code for retrieving the state information from a memory device that is accessible by the second base unit.

25. The computer program product as defined by claim 21 wherein the first and second base units are cable modem termination systems.

26. The computer program product as defined by claim 21 wherein the base unit communicates with the network device via wireless transmission techniques.

27. The computer program product as defined by claim 21 wherein the state information relates to use of the second channel by the network device.

28. The computer program product as defined by claim 21 wherein the state information relates to at least one of bandwidth, quality of service, throughput, security, and policy data.

29. The computer program product as defined by claim 21 wherein the second base unit executes the program code for communicating and the program code for applying, the computer program product further comprising:

program code for causing the second base unit to determine if it is to communicate with the network device via the second channel.

30. The computer program product as defined by claim 21 wherein the program code for applying comprises:

program code for transmitting a message to the network device, the message including the state information.

31. A system for maintaining state information relating to a network device changing from a first channel to a second channel, the system comprising:

a first base unit having a first interface to the first channel, the first base unit also including the state information;

a second base unit having a second interface to the second channel, the second base unit being independently operable from the first base unit; and a state module capable of obtaining the state information for the second base unit.

32. The system as defined by claim 31 wherein the state module is an intermediate network device.

33. The system as defined by claim 31 wherein the state module is a part of at least one of the first and second base units.

34. The system as defined by claim 31 wherein the first base unit and second base unit are in a peer-to-peer relationship.

35. The system as defined by claim 31 wherein the state module includes an interface capable of transmitting a message to the second base unit, the message including the state information.

36. The system as defined by claim 31 wherein the base units each are cable modem termination systems.

37. A method of controlling the communication of a network device with a head end in a data transmission system, the network device being registered with a first channel, the method comprising:

determining that the network device is to be moved from the first channel to a second channel, the first channel being associated with a first base unit, the second channel being associated with a second base unit, the first and second base units being part of the head end and being independently operating network devices;

communicating with the network device via the second channel; and obtaining state information relating to the network device.

38. The method as defined by claim 37 further comprising: applying the state information to the communication of the network device with the second base unit.

39. The method as defined by claim 37 wherein the first base unit is a cable modem termination system.

40. The method as defined by claim 37 wherein the state information relates to at least one of bandwidth, quality of service, throughput, security, and policy data.

41. The method as defined by claim 37 wherein the act of obtaining comprises retrieving the state information from the first base unit.

42. The method as defined by claim 37 wherein the act of obtaining comprises retrieving the state information from an intermediate network device.

43. A computer program product for use on a computer system for controlling the communication of a network device with a head end in a data transmission system, the network device being registered with a first channel, the computer program product comprising a computer usable medium having computer readable code thereon, the computer readable program code comprising:

program code for determining that the network device is to be moved from the first channel to a second channel, the first channel being associated with a first base unit, the second channel being associated with a second base unit, the first and second base units being part of the head end and being independently operating network devices;

program code for communicating with the network device via the second channel; and program code for obtaining state information relating to the network device.

44. The computer program product as defined by claim 43 further comprising:

program code for applying the state information to the communication of the network device with the second base unit.

45. The computer program product as defined by claim 43 wherein the first base unit is a cable modem termination system.

46. The computer program product as defined by claim 43 wherein the state information relates to at least one of bandwidth, quality of service, throughput, security, and policy data.

47. The computer program product as defined by claim 43 wherein the program code for obtaining comprises retrieving the state information from the first base unit.

48. The computer program product as defined by claim 43 wherein the program code for obtaining comprises retrieving the state information from an intermediate network device.

\* \* \* \* \*